Sept. 24, 1946.    T. J. SCHUETZ ET AL    2,408,179
FRICTION BRAKE
Filed July 10, 1945    4 Sheets-Sheet 1

Inventor:
THOMAS J. SCHUETZ, AND
EDWIN W. TURNQUIST.

By Prevost & Prevost
Attorneys

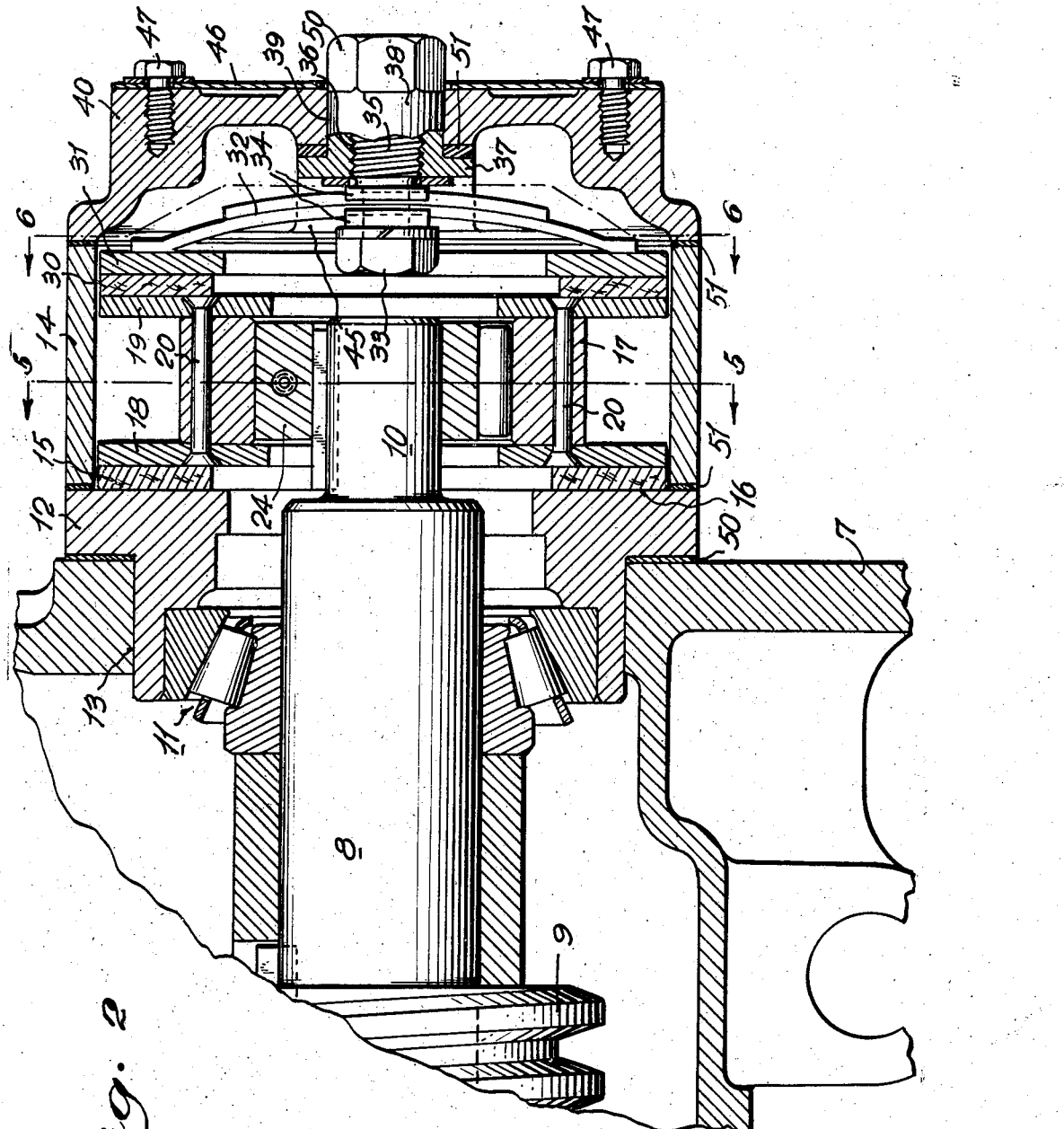

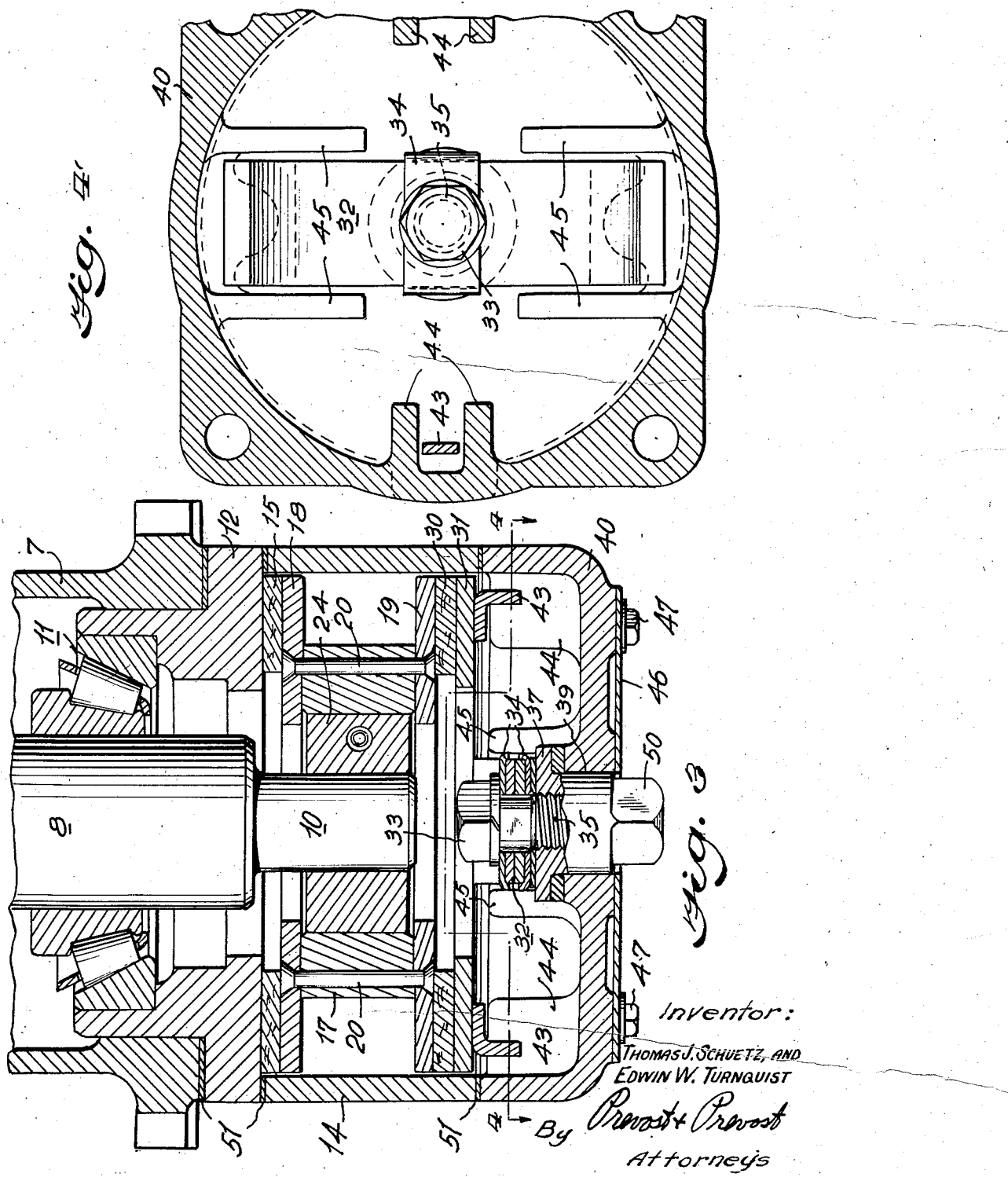

Sept. 24, 1946.  T. J. SCHUETZ ET AL  2,408,179
FRICTION BRAKE
Filed July 10, 1945   4 Sheets-Sheet 4

Inventor:
THOMAS J. SCHUETZ, AND
EDWIN W. TURNQUIST

Prevost + Prevost
By   Attorneys

Patented Sept. 24, 1946

2,408,179

UNITED STATES PATENT OFFICE 2,408,179

FRICTION BRAKE

Thomas J. Schuetz and Edwin W. Turnquist, Tulsa, Okla., assignors, by mesne assignments, to John E. Mabee, Thomas J. Schuetz, and Logan Stephenson, all of Tulsa, Okla.

Application July 10, 1945, Serial No. 604,202

4 Claims. (Cl. 188—82)

1

This invention relates to improvements in friction brakes and more particularly to automatic brakes for use with a worm drive of a hoisting apparatus. A brake of this type is shown in the T. J. Schuetz Patent 1,870,532, August 9, 1932, and the action and function of the improved brake is similar to that disclosed in said patent.

One of the objects of the present invention is to provide improved means for use in adjusting the brake elements.

Another object is to supply improved spring means for forcing friction discs into tight engagement with one another, and novel means for adjusting the spring means from the exterior of the apparatus.

With the foregoing objects outlined and with other objects in view, which will appear as the description proceeds, the invention consists of the novel features hereinafter described in detail, illustrated in the accompanying drawings and more particularly pointed out in the appended claims.

In the drawings:

Fig. 2 is a vertical longitudinal sectional view taken on the line 2—2 of Fig. 1.

Fig. 3 is a horizontal sectional view on the line 3—3 of Fig. 1.

Fig. 4 is a transverse sectional view on the line 4—4 of Fig. 3.

Figure 1:
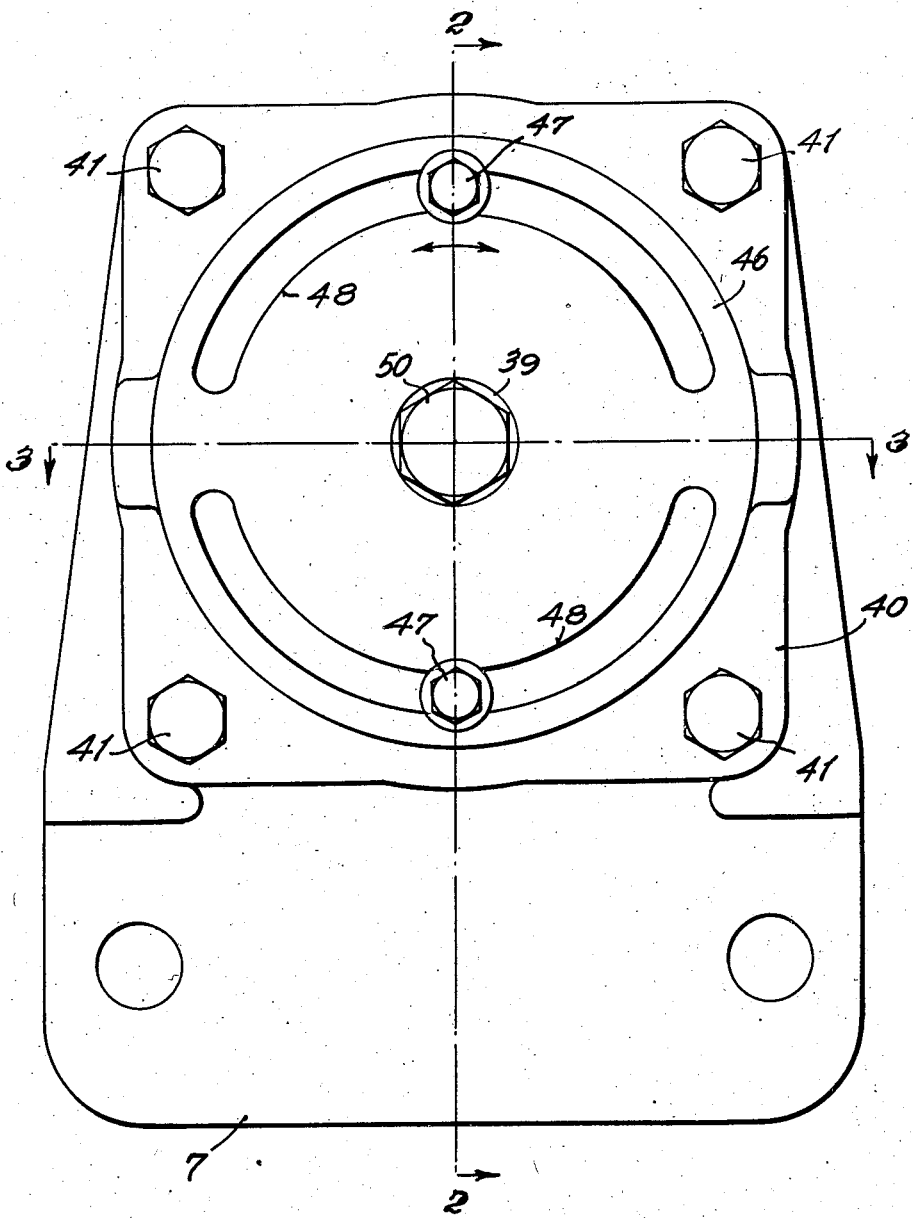
Fig. 1 is an elevation of an end portion of the new braking mechanism.
Figure 5:
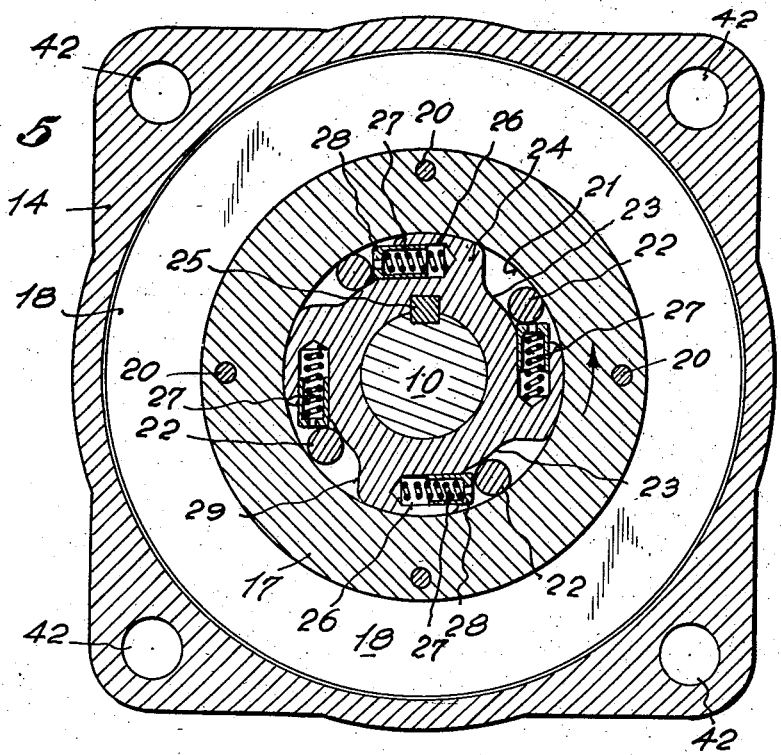
Figure 6:
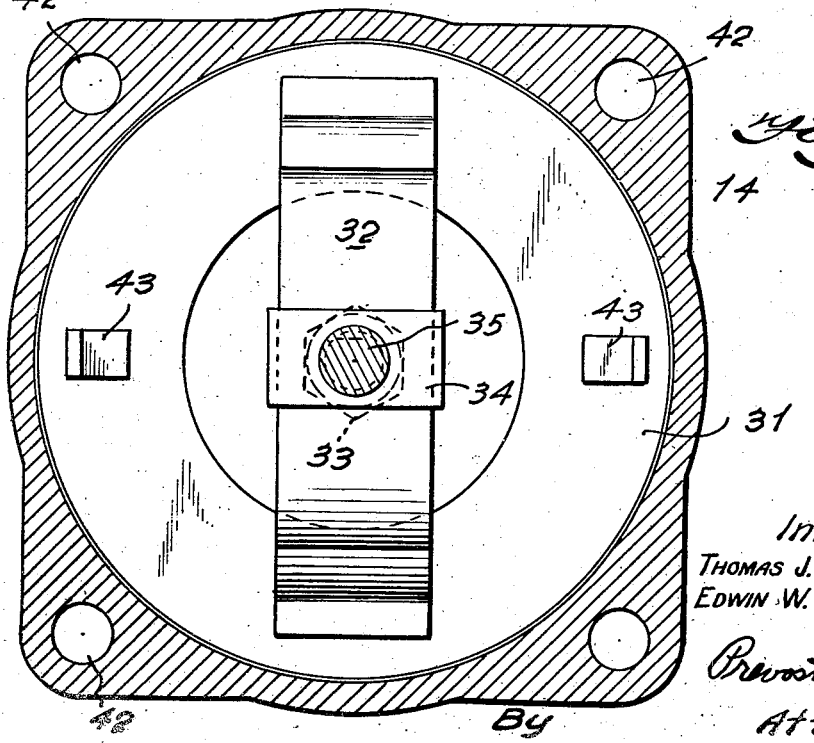

Figs. 5 and 6 are similar views on the lines 5—5 and 6—6 respectively of Fig. 2.

Referring to the drawings, 7 designates a conventional hoisting machine housing containing a worm gear shaft 8, the worm gear 9 of which is arranged for engagement with the drum gear (not shown). In accordance with the present invention, the shaft 8 is extended and projects beyond the boundaries of the housing 7, being reduced at its end portion 10 (Figs. 2 and 3). The shaft is journalled in a suitable anti-friction bearing 11, mounted in a ring 12 which extends snugly within an aperture 13 of the housing.

A stationary housing collar 14 projects from the ring and arranged within the collar is a friction disc 15, bearing at one side against the outer surface of the ring 12, as indicated at 16. A race ring or clutch casing 17, also positioned within the collar, is arranged between a pair of friction discs 18 and 19 that project radially beyond the race ring and are fixedly connected to one another by rivets 20 or the like which extend through the outer race ring.

As shown in Fig. 5, the race ring has an inner

2 circular track 21 engaged by rollers 22, positioned in notches 23, arranged in spaced relation about the periphery of a roller carrier or clutch member 24. The latter is keyed to the extension 10 of the shaft, as indicated at 25, and is provided with tangential wells 26 for the reception of coil springs 27 that force pistons 28, guided by the wells, against the rollers 22 and force them toward the inclined end surface 29 of the member 24. It will be obvious that this construction will permit the shaft and roller carrier to travel counter-clockwise (Fig. 5) without moving the race ring 17, but should the shaft attempt to turn in the opposite direction, the spring-pressed pistons would cause the rollers to move up the inclined surfaces of the notches and thus bind the rollers against the race ring 17, for braking purposes, as will be explained further.

Another friction ring 30 bears against the outer side of the disc 19, and a pressure plate 31 bears against the opposite side of the plate 30.

The pressure plate is yieldingly forced toward the ring 12 to effect friction between the brake parts, by means of a leaf spring 32 which may have its medial portion secured to a bolt 33 by means of clamping plates 34 mounted on the bolt. The bolt is arranged co-axial with the shaft and the ends of the leaf spring constantly bear upon the pressure disc at 31 at diametrically opposite points.

For the purpose of moving the bolt toward and away from the shaft, the threaded portion 35 of the bolt engages internal threads 36 in a nut 37 which has a cylindrical portion 38 swivelled in a cylindrical bore 39 of a cover 40. At this point, it will be noted that the parts 12, 14 and 40 may be secured together by any suitable means, such as screws 41, which extend through apertures 42 in these parts and are anchored in the housing 7.

To prevent relative turning of the pressure plate 31 and cover 40, the former is provided with lugs 43 which may be welded to the plate and project outwardly into bifurcations 44, provided at the inside of the cover. The cover is preferably provided at 180° to the bifurcations 44 with diametrically opposite bifurcations 45 (Fig. 4) which serve as confining means for the leaf spring.

For adjustment purposes, an adjustable disc 46 is arranged at the exterior of the cover and connected to the latter by screws 47 which extend through substantially semi-circular slots 48 in the disc and are anchored in the cover. The central portion of the disc is provided with an angular aperture 49 to snugly receive the angular head 50 of the nut 37. Due to this construction, it will be understood that if the disc 46 is turned in one direction, the medial portion of the leaf spring will be moved toward the shaft 8 to increase the friction between parts 15, 18, 19, 30 and 31, but if the disc is turned in the opposite direction, the friction will be reduced.

It will be observed that the parts are so constructed and arranged that lubricating oil from within the housing 7 may flow to and from the braking mechanism, and that gaskets 51 are employed, where necessary, to prevent the escape of oil.

From the foregoing, it is believed that the construction, operation and advantages of the improved mechanism may be readily understood by those skilled in the art, and we are aware changes may be made in the details disclosed, without departing from the spirit of the invention, as expressed in the following claims.

What we claim and desire to secure by Letters Patent is:

1. In a friction braking mechanism of the type comprising a shaft having a portion arranged within a housing, a friction plate unit in the housing surrounding the shaft and comprising a plurality of friction plates secured together with a clutch casing interposed therebetween, a clutch member fixed on the shaft and rotatable therewith, within said clutch casing, said clutch being adapted to rotate freely in one direction and engage said friction plate unit when force is applied in the reverse direction, and a pressure member adapted to normally prevent the rotation of said unit, the improvement comprising a leaf spring having its ends operatively connected to the pressure member, and means operable from the exterior of the braking mechanism for adjusting said spring to increase or decrease pressure of the spring on the pressure member, said means including a threaded member, and a rotatable disc operably connected to the threaded member and arranged at the exterior of the braking mechanism.

2. In a friction braking mechanism of the type comprising a shaft having a portion arranged within the housing, a friction plate unit in the housing surrounding the shaft and comprising a plurality of friction plates secured together with a clutch casing interposed therebetween, a clutch member fixed on the shaft and rotatable therewith, within said clutch casing, said clutch being adapted to rotate freely in one direction and engage said friction plate unit when force is applied in the reverse direction, and a pressure member adapted to normally prevent the rotation of said unit, the improvement comprising a cover for the housing having a central aperture, a nut rotatably mounted in said aperture, a disc fixed to the external portion of the nut for rotation therewith, means for locking the disc to the cover, a bolt having threaded connection with the nut, a leaf spring having its end portions operatively connected to the pressure member and its medial portion secured to the bolt, and means for preventing the pressure member and spring from turning about the axis of the shaft.

3. In braking mechanism of the character described, a pressure member, a housing in which the pressure member is arranged, a nut rotatably mounted in a wall of the housing, a disc arranged at the exterior of the housing and operatively connected to the nut for rotating the latter, means for locking the disc to the housing, a bolt having threaded connection with the nut, a leaf spring having its end portions operatively connected to the pressure member and its medial portion secured to the bolt, and means for preventing the pressure member and spring from turning about the axis of the bolt.

4. In friction braking mechanism of the character described, a pressure member, a housing in which the pressure member is arranged, a threaded member rotatably mounted in a wall of the housing, a disc arranged at the exterior of the housing and connected to the threaded member for rotation therewith, means for locking the disc to the housing, a second threaded member having threaded connection with the first threaded member, and a leaf spring having its end portions operatively connected to the pressure member and its medial portion secured to the second threaded member.

THOMAS J. SCHUETZ.
EDWIN W. TURNQUIST.